(12) United States Patent
Wang (10) Patent No.: US 9,652,009 B2
(45) Date of Patent: May 16, 2017

(54) CURRENT REGULATION CIRCUIT, POWER OVER ETHERNET SYSTEM, AND METHOD

(71) Applicant: HON HAI PRECISION INDUSTRY CO., LTD., New Taipei (TW)

(72) Inventor: Yi-Feng Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 585 days.

(21) Appl. No.: 14/191,458

(22) Filed: Feb. 27, 2014

(65) Prior Publication Data

US 2014/0284997 A1    Sep. 25, 2014

(30) Foreign Application Priority Data

Mar. 19, 2013    (TW) .............................. 102109567 A (51) Int. Cl.
*G06F 1/26* (2006.01)
*H04L 12/40* (2006.01)
*H04L 12/10* (2006.01)

(52) U.S. Cl.
CPC .............. *G06F 1/266* (2013.01); *H04L 12/10* (2013.01); *H04L 12/40045* (2013.01)

(58) Field of Classification Search
CPC ... H04L 12/40; H04L 12/40045; H04L 12/10; G06F 1/266; G06F 1/26
See application file for complete search history.

(56) References Cited

U.S. PATENT DOCUMENTS 9,024,473 B2 *   5/2015   Huff ........................ G06F 1/266
                                                        307/52

FOREIGN PATENT DOCUMENTS

CN    102801535    11/2012
TW    201304453    1/2013

* cited by examiner

*Primary Examiner* — Ryan Johnson
(74) *Attorney, Agent, or Firm* — Steven Reiss (57) ABSTRACT

A current regulation circuit includes a number of current regulation units. Each of the current regulation units includes a sampling unit, a mean conversion unit, a current integration unit, a comparison unit, and a voltage conversion unit. The sampling unit outputs sampling current signals according to output current signals of a POE port. The mean conversion unit converts the sampling current signals into mean current signals. The current integration unit integrates and converts the mean current signals output by the number of current regulation units into output reference current signals. The comparison unit compares the mean current signals with the reference current signals, and outputs comparison signals based on the comparison. The voltage conversion unit regulates the output current signals according to the comparison signals output by the comparison unit. A POE system and method are also provided.

29 Claims, 8 Drawing Sheets

CURRENT REGULATION CIRCUIT, POWER OVER ETHERNET SYSTEM, AND METHOD

BACKGROUND

1. Technical Field

The disclosure relates to current regulation circuits, and particularly to a current regulation circuit used in a power over Ethernet (POE) system and method.

2. Description of Related Art

Most POE ports of a POE system supply 25.5 W (watt) power. A network device requiring a large amount of power requires a plurality of POE ports to supply power in parallel to operate. However, the plurality of POE ports may be connected to the network device via cables having different impedances, which causes current signals flowing through the cables to be different. Thus, the plurality of POE ports cannot supply maximum power to drive the network device. Therefore, there is a need for a POE system that can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
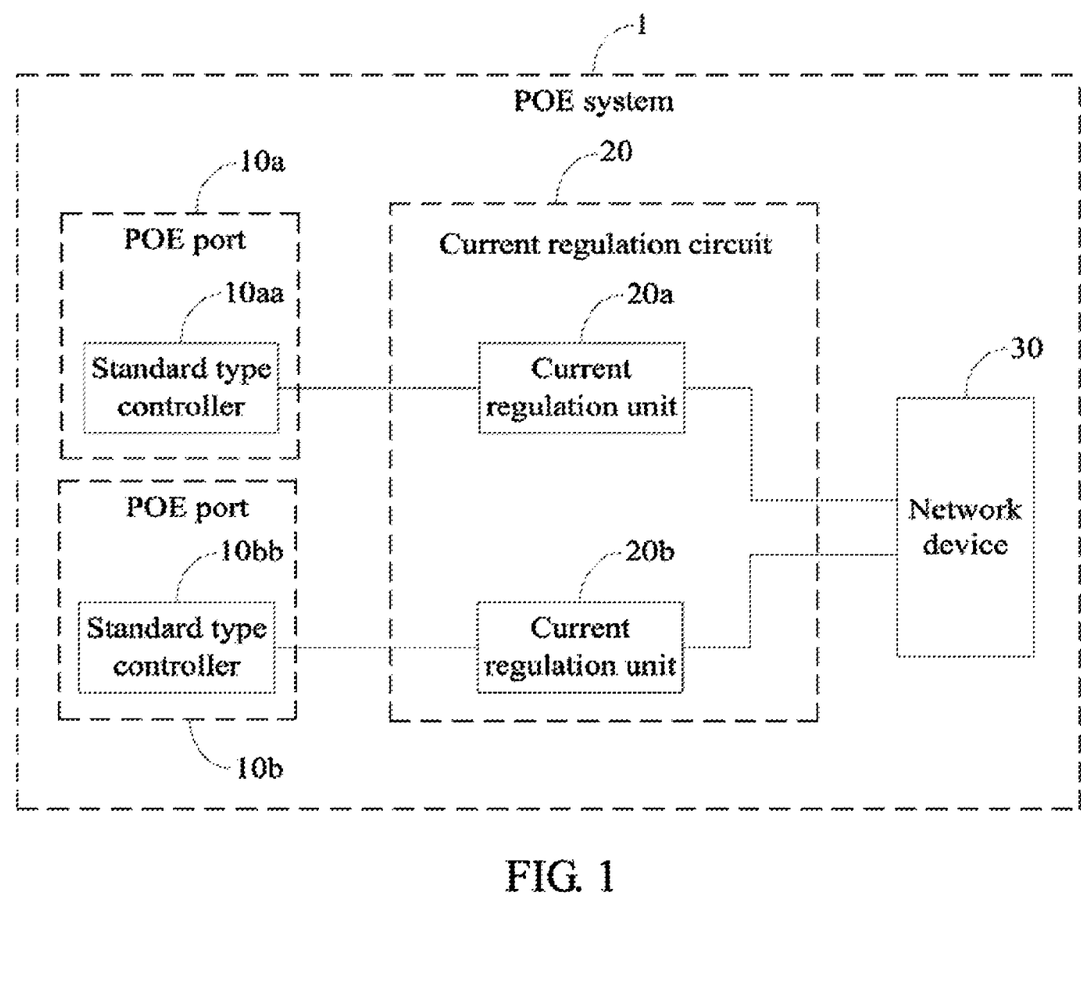
FIG. 1 is a schematic diagram of a first embodiment of a POE system, wherein the POE system comprises a current regulation circuit.

FIG. 1 is a schematic diagram of a first embodiment of a POE system 1. In one embodiment, the POE system 1 comprises a plurality of POE ports, such as a POE port 10$a$ and a POE port 10$b$, a current regulation circuit 20, and a network device 30. The POE ports 10$a$, 10$b$ comprise a standard type controller 10$aa$ and a standard type controller 10$bb$, respectively. The current regulation circuit 20 comprises a plurality of current regulation units, such as a current regulation unit 20$a$ and a current regulation unit 20$b$. The current regulation units 20$a$, 20$b$ are connected to the POE port 10$a$ and the POE port 10$b$, respectively. Thus, a number of the current regulation units is equivalent to a number of the POE ports. The current regulation circuit 20 makes the POE ports 10$a$, 10$b$ output substantially the same value of current signals in parallel to drive the network device 30.

In one embodiment, the POE ports 10$a$, 10$b$ are connected to ports of a power over Ethernet (POE) device via cables having different lengths or different impedances. The POE ports 10$a$, 10$b$ and the current regulation circuit 20 can be set in the network device 30.

Figure 2:
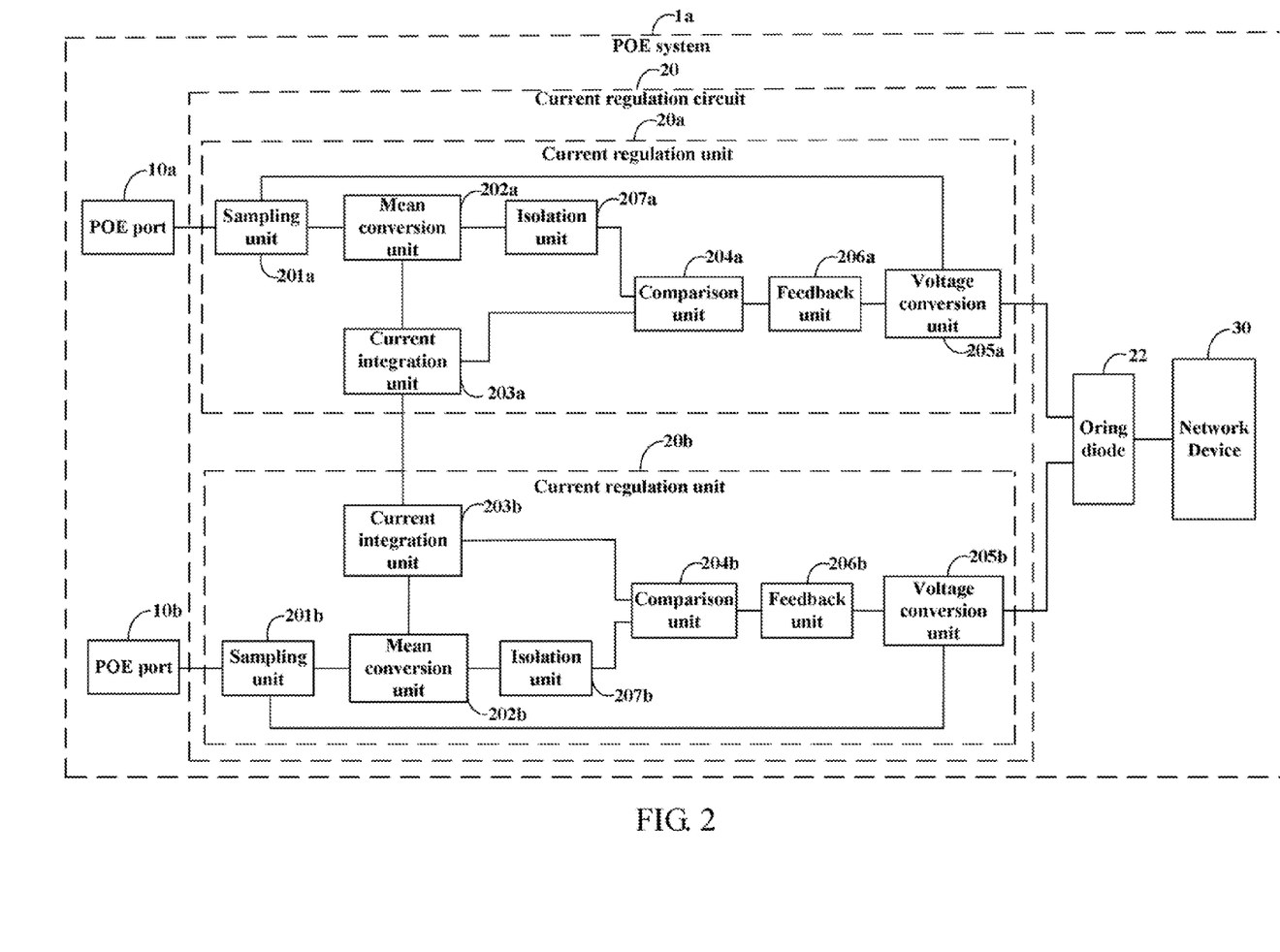
FIG. 2 is a schematic diagram of a second embodiment of a POE system.

FIG. 2 is a schematic diagram of a second embodiment of a POE system 1$a$. In one embodiment, the POE system 1$a$ further comprises an O-ring diode 22. An input terminal of the O-ring diode 22 is connected to the current regulation units 20$a$, 20$b$, and an output terminal of the O-ring diode 22 is connected to the network device 30. The O-ring diode 22 integrates current signals output by the current regulation units 20$a$, 20$b$, to drive the network device 30. A value of input current signals of the network device 30 is equal to a sum of values of current signals of the current regulation units 20$a$, 20$b$.

The current regulation unit 20$a$ comprises a sampling unit 201$a$, a mean conversion unit 202$a$, a current integration unit 203$a$, a comparison unit 204$a$, and a voltage conversion unit 205$a$. The sampling unit 201$a$ is connected to the POE port 10$a$ and outputs sampling current signals according to output current signals of the POE port 10$a$. The mean conversion unit 202$a$ is connected to the sampling unit 201$a$ and converts the sampling current signals output by the sampling unit 201$a$ into mean current signals. The current integration unit 203$a$ is connected to the mean conversion unit 202$a$ and the current regulation unit 20$b$. The current integration unit 203$a$ integrates and converts the mean current signals output by the current regulation units 20$a$, 20$b$ into reference current signals. The comparison unit 204$a$ is connected to the mean conversion unit 202$a$ and the current integration unit 203$a$. The comparison unit 204$a$ compares the mean current signals output by the mean conversion unit 202$a$ with the reference current signals output by the current integration unit 203$a$, and outputs comparison signals. The voltage conversion unit 205$a$ is connected to the sampling unit 201$a$ and the comparison unit 204$a$. The voltage conversion unit regulates the output current signals of the POE port 10$a$ according to the comparison signals output by the comparison unit 204$a$.

In one embodiment, in response to the POE port 10$a$ operating according to the IEEE802.3AT standard, the standard type controller 10$aa$ outputs first standard type instruction signals. In response to the POE port 10$a$ operating according to the IEEE802.3AF standard, the standard type controller 10$aa$ outputs second standard type instruction signals.

In one embodiment, the current regulation unit 20$a$ further comprises a feedback unit 206$a$. The feedback unit 206$a$ is connected between the comparison unit 204$a$ and the voltage conversion unit 205$a$. The feedback unit 206$a$ outputs feedback signals according to the comparison signals output by the comparison unit 204$a$, and the voltage conversion unit 205$a$ regulates the output current signals of the POE port 10$a$ according to the feedback signals.

In one embodiment, the current regulation unit 20$a$ further comprises an isolation unit 207$a$. The isolation unit 207$a$ is connected between the mean conversion unit 202$a$ and the comparison unit 204$a$. The isolation unit 207$a$ isolates the mean current signals output by the mean conversion unit 202$a$ from the reference current signals output by the current integration unit 203a to avoid mutual interference between the mean current signals and the reference current signals.

In one embodiment, the current regulation unit 20b comprises a sampling unit 201b, a mean conversion unit 202b, a current integration unit 203b, a comparison unit 204b, a voltage conversion unit 205b, a feedback unit 206b, and an isolation unit 207b. A circuit diagram and operating principle of the current regulation unit 20b are the same as a circuit diagram and operating principle of the current regulation unit 20a.

Figure 3:
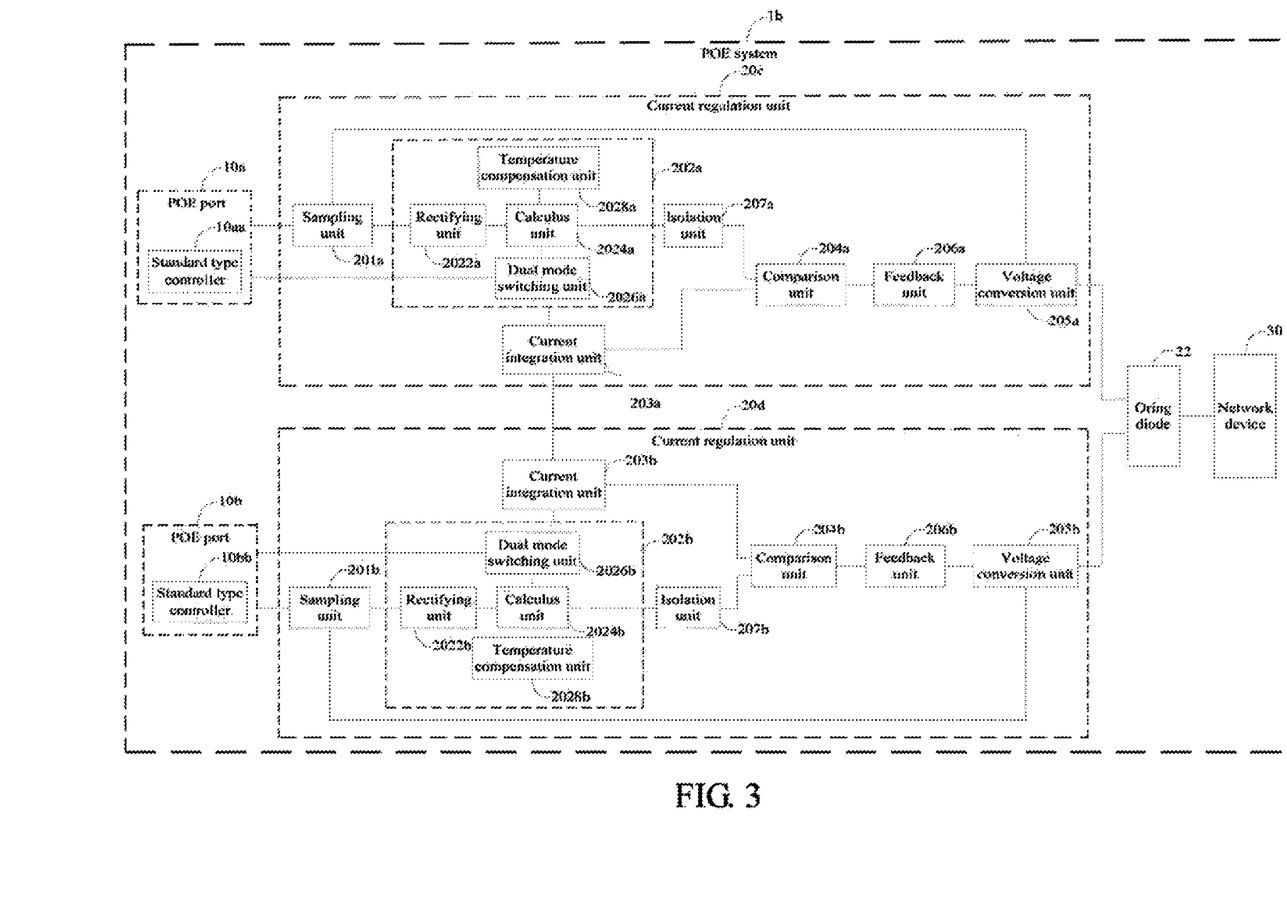
FIG. 3 is a schematic diagram of a third embodiment of a POE system.

FIG. 3 is a schematic diagram of a third embodiment of a POE system 1b. In one embodiment, the POE system 1b comprises a plurality of current regulation units, such as a current regulation unit 20c and a current regulation unit 20d. The current regulation unit 20c is similar to the current regulation unit 20d. The difference between the POE system 1b and the POE system 1a is that the mean conversion unit 202a further comprises a rectifying unit 2022a, a calculating unit 2024a, a dual mode switching unit 2026a, and a temperature compensation unit 2028a. The mean conversion unit 202b further comprises a rectifying unit 2022b, a calculating unit 2024b, a dual mode switching unit 2026b, and a temperature compensation unit 2028b. The POE port 10a comprises the standard type controller 10aa, and the standard type controller 10aa outputs standard type instruction signals. The POE port 10b comprises the standard type controller 10bb, and the standard type controller 10bb outputs the standard type instruction signals.

The rectifying unit 2022a is connected to the sampling unit 201a. The rectifying unit 2022a rectifies the sampling current signals output by the sampling unit 201a. The calculating unit 2024a is connected between the rectifying unit 2022a and the isolation unit 207a. The calculating unit 2024a receives the rectified sampling current signals from the rectifying unit 2022a, and converts the rectified sampling current signals into the mean current signals.

The dual mode switching unit 2026b is connected to the calculating unit 2024a and the standard type controller 10aa. The dual mode switching unit 2026a regulates the mean current signals output by the calculating unit 2024a according to the standard type instruction signals output by the standard type controller 10aa. The temperature compensation unit 2028a is connected to the calculating unit 2024a. The temperature compensation unit 2028a detects an external environment temperature to regulate the mean current signals output by the calculating unit 2024a.

In one embodiment, in response to the POE port 10a operating according to the IEEE802.3AT standard, the standard type controller 10aa outputs first standard type instruction signals. In response to the POE post 10a operating according to the IEEE802.3AF standard, the standard type controller 10aa outputs second standard type instruction signals.

Figure 4:
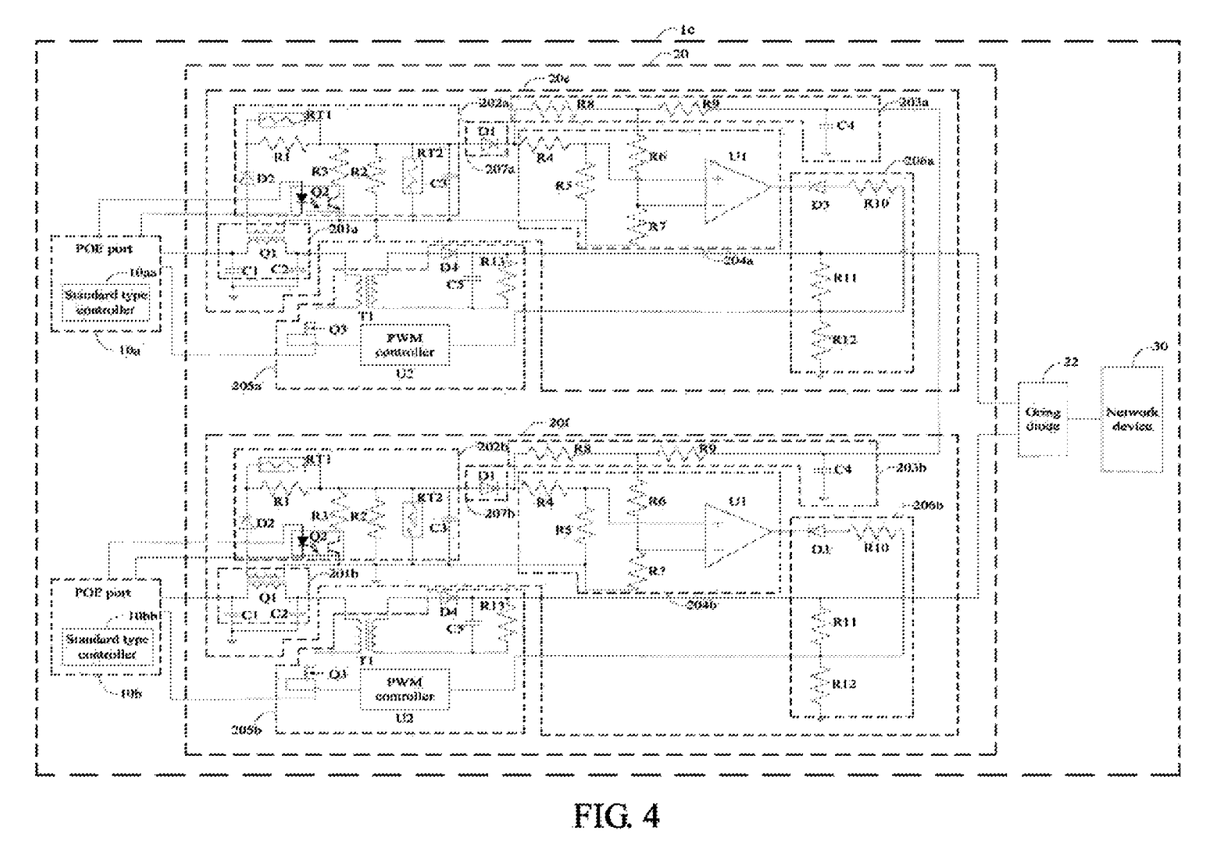
FIG. 4 is a circuit diagram of a fourth embodiment of a POE system.

FIG. 4 is a circuit diagram of a fourth embodiment of a POE system 1c. The POE system 1c comprises a plurality of current regulation units 20, such as a current regulation unit 20e and a current regulation unit 20f. The sampling unit 201a comprises an induction coil Q1, a first capacitor C1, and a second capacitor C2. The induction coil Q1 comprises a first coil (not labeled) and a second coil (not labeled). The first coil is an input terminal of the induction coil Q1, and the second coil is an output terminal of the induction coil Q1. A first end of the first coil is connected to the POE port 10a, and a second end of the first coil is connected to the voltage conversion unit 205a. A first end of the second coil is connected to the mean conversion unit 202a, and a second end of the second coil is grounded. A first end of the first capacitor C1 is connected to a node between the POE port 10a and the induction coil Q1, and a second end of the first capacitor C1 is grounded. A first end of the second capacitor C2 is connected to a node between the induction coil Q1 and the voltage conversion unit 205a, and a second end of the second capacitor C2 is grounded. The first capacitor C1 and the second capacitor C2 filter the output current signals of the POE port 10a. The induction coil Q1 samples the output current signals of the POE port 10a, and sends the sampled current signals to the mean conversion unit 202a.

In one embodiment, the sampling unit 201a regulates a percentage of the sampling current signals in the output current signals of the POE port 10a according to actual circuit designs. The sampling unit 201a regulates the percentage of the sampling current signals in the output current signals by regulating a ratio of the first coil being active and the second coil being active.

In one embodiment, the sampling unit 201a can include a resistor instead of the induction coil Q1 to sample current signals, and the sampling unit 201a can be other sampling modules in other embodiments.

The isolation unit 207a comprises a first diode D1. An anode of the first diode D1 is connected to the calculating unit 2024a, and a cathode of the first diode D1 is connected to the comparison unit 204a. The isolation unit 207a isolates the mean current signals output by the mean conversion unit 202a from the reference current signals output by the current integration unit 203a. The isolation unit 207a prevents interference between the mean current signals and the reference current signals, so that the comparison unit 204a can accurately compare the mean current signals and the reference current signals.

The mean conversion unit 202a comprises the rectifying unit 2022a, the calculating unit 2024a, the dual mode switching unit 2026a, and the temperature compensation unit 2028a. The rectifying unit 2022a comprises a second diode D2. The calculating unit 2024a comprises a first resistor R1, a second resistor R2, and a third capacitor C3. The dual mode switching unit 2026a comprises a third resistor R3 and a photoelectric sensor Q2. The temperature compensation unit 2028a comprises a first thermistor RT1 and a second thermistor RT2.

An anode of the second diode D2 is connected to the sampling unit 201a, and a cathode of the second diode D2 is connected to a first end of the first resistor R1. A second end of the first resistor R1 is connected to the anode of the first diode D1. A first end of the second resistor R2 is connected to a node between the first resistor R1 and the first diode D1, and a second end of the second resistor R2 is grounded. A first end of the third capacitor C3 is connected to a node between the first resistor R1 and the second resistor R2, and a second end of the third capacitor C3 is grounded. The first thermistor RT1 is connected to the first resistor R1 in parallel, and the second thermistor RT2 is connected to the second resistor R2 in parallel. The photoelectric sensor Q2 comprises an input terminal and an output terminal. The input terminal of the photoelectric sensor Q2 is connected to the standard type controller 10aa, and the output terminal of the photoelectric sensor Q2 is connected between a first end of the third resistor R3 and ground. A second end of the third resistor R3 is connected to a node between the first resistor R1 and the second resistor R2. The input terminal of the photoelectric sensor Q2 is an emitting terminal and comprises a light emitting diode. The output terminal of the photoelectric sensor Q2 is a receiving terminal and comprises a phototransistor. The input terminal of the photoelectric sensor Q2 and the output terminal of the photoelectric sensor Q2 communicate through light. The photoelectric sensor Q2 transforms changes in light intensity into electric signals, and transmits the electric signals.

In one embodiment, when the standard type controller 10*aa* outputs the first standard type instruction signals, the standard type controller 10*aa* controls the photoelectric sensor Q2 to turn on. When the standard type controller 10*aa* outputs the second standard type instruction signals, the standard type controller 10*aa* controls the photoelectric sensor Q2 to turn off.

The temperature compensation unit 2028*a* regulates the mean current signals output by the calculating unit 2024*a* according to the external environment temperature detected by the first thermistor RT1 and the second thermistor RT2. The temperature compensation unit 2028*a* reduces an offset error of the calculating unit 2024*a* in a high temperature state. In one embodiment, when a value of the external environment temperature is greater than 50 degrees, the external environment temperature is in a high temperature state.

The comparison unit 204*a* comprises a comparator U1, a fourth resistor R4, a fifth resistor R5, a sixth resistor R6, and a seventh resistor R7. The comparator U1 comprises a positive input terminal, a negative input terminal, and an output terminal. The output terminal of the comparator U1 is connected to the feedback unit 206*a*. A first end of the fourth resistor R4 is connected to the cathode of the first diode D1, and a second end of the fourth resistor R4 is connected to the positive input terminal of the comparator U1. A first end of the fifth resistor R5 is connected to a node between the positive input terminal of the comparator U1 and the fourth resistor R4, and a second end of the fifth resistor R5 is grounded. A first end of the sixth resistor R6 is connected to the current integration unit 203*a*, and a second end of the sixth resistor R6 is connected to the negative input terminal of the comparator U1. A first end of the seventh resistor R7 is connected to a node between the negative input terminal of the comparator U1 and the sixth resistor R6, and a second end of the seventh resistor R7 is grounded.

In one embodiment, a resistance of the fourth resistor R4 is equivalent to a resistance of the sixth resistor R6, and a resistance of the fifth resistor R5 is equivalent to a resistance of the seventh resistor R7. In response to a value of the mean current signals output by the mean conversion unit 202*a* being greater than a value of the reference current signals output by the current integration unit 203*a*, the comparator U1 outputs high-level signals. In response to the value of the mean current signals output by the mean conversion unit 202*a* being less than the value of the reference current signals output by the current integration unit 203*a*, the comparator U1 outputs low-level signals. The comparison unit 204*a* compares the output current signals of the POE ports 10*a*, 10*b* to each other, and outputs a corresponding comparison signal.

The current integration unit 203*a* comprises a fourth capacitor C4, an eighth resistor R8, and a ninth resistor R9. A first end of the eighth resistor R8 is connected to a node between the first diode D1 and the fourth resistor R4, and a second end of the eighth resistor R8 is connected to the first end of the sixth resistor R6. A first end of the ninth resistor R9 is connected to a node between the sixth resistor R6 and the eighth resistor R8, and a second end of the ninth resistor R9 is connected to a first end of the fourth capacitor C4 and the current integration unit 203*b*. A second end of the fourth capacitor C4 is grounded. The current integration unit 203*a* integrates and converts the mean current signals output by the mean conversion unit 202*a* and the mean current signals output by the mean conversion unit 202*b*.

The current integration unit 203*a* regulates a resistance of the eighth resistor R8 and the ninth resistor R9 to regulate a threshold value of a difference between the mean current signals output by the mean conversion unit 202*a* and the reference current signals output by the current integration unit 203*a*. For example, the threshold value of the difference between the mean current signals output by the mean conversion unit 202*a* and the reference current signals output by the current integration unit 203*a* is 0.5. Thus, when the difference between the mean current signals output by the mean conversion unit 202*a* and the reference current signals output by the current integration unit 203*a* is greater than 0.5, the comparison unit outputs the comparison signals.

In one embodiment, the current regulation circuit 20 comprises two current regulation units 20*e*, 20*f*. The current regulation unit 20*e* is connected to the current regulation unit 20*f*. A value of the reference current signals output by the current integration unit 20*e* are equivalent to a maximum value between the mean current signals output by the mean conversion unit 202*a* and the mean current signals output by the mean conversion unit 202*b*. That is, when the value of the mean current signals output by the mean conversion unit 202*a* is greater than the value of the mean current signals output by the mean conversion unit 202*b*, the value of the reference current signals output by the current integration unit 20*e* is equivalent to the value of the mean current signals output by the mean conversion unit 202*a*. When the value of the mean current signals output by the mean conversion unit 202*b* is greater than the value of the mean current signals output by the mean conversion unit 202*a*, the value of the reference current signals output by the current integration unit 20*e* is equivalent to the value of the mean current signals output by the mean conversion unit 202*b*. The output current signals of each of the POE ports 10*a*, 10*b* are compared with the output current signals of the maximum value between the POE ports 10*a*, 10*b*. When the current regulation circuit 20 comprises more than two current regulation units 20*e*, 20*f*, the current regulation units 20*e*, 20*f* are connected together.

The feedback unit 206*a* comprises a third diode D3, a tenth resistor R10, an eleventh resistor R11, and a twelfth resistor R12. A cathode of the third diode D3 is connected to the output terminal of the comparator U1, and an anode of the third diode D3 is connected to a first end of the tenth resistor R10. A second end of the tenth resistor R10 is connected to the voltage conversion unit 205*a* and a first end of the eleventh resistor R11. A second end of the eleventh resistor R11 is connected to the voltage conversion unit 205*a*. A first end of the twelfth resistor R12 is connected to a node between the tenth resistor R10 and the eleventh resistor R11, and a second end of the twelfth resistor R12 is grounded. In response to the comparison unit 204*a* outputting the high-level signals, the eleventh resistor R11 is connected to the twelfth resistor R12 in series, and a voltage of the first end of the twelfth resistor R12 is a first fixed value. In response to the comparison unit 204*a* outputting the low-level signals, the tenth resistor R10 is connected to the twelfth resistor R12 in parallel, and a voltage of the first end of the twelfth resistor R12 changes to a second fixed value. The feedback unit 206*a* generates the feedback signals according to the change in voltage of the first end of the twelfth resistor R12.

The voltage conversion unit 205a comprises a PWM controller U2, a transformer T1, a switch Q3, a fifth capacitor C5, a fourth diode D4, and a thirteenth resistor R13. The transformer T1 comprises a first input terminal, a second input terminal, a first output terminal, and a second output terminal. The first input terminal of the transformer T1 is connected to a node between the induction coil Q1 and the second capacitor C2. The switch Q3 comprises a control terminal, a first terminal, and a second terminal. The control terminal of the switch Q3 is connected to the PWM controller U2. The first terminal of the switch Q3 is connected to the second input terminal of the transformer T1. The second terminal of the switch Q3 is grounded. An anode of the fourth diode D4 is connected to the first output terminal of the transformer T1, and a cathode of the fourth diode D4 is connected to a first end of the fifth capacitor C5. A second end of the fifth capacitor C5 is connected to the second output terminal of the transformer T1 and ground. A first end of the thirteenth resistor R13 is connected to a node between the fourth diode D4 and the fifth capacitor C5, and further connected to the second end of the eleventh resistor R11. A second end of the thirteenth resistor R13 is grounded. The PWM controller U1 outputs PWM signals and regulates a duty cycle of the PWM signals according to the feedback signals output by the feedback unit 206a, to regulate an input voltage of the voltage conversion unit 20e, and to regulate the output current signals of the POE port 10a. The fourth diode D4 and the fifth capacitor C5 rectify and filter output voltage signals output by the transformer T1.

In one embodiment, the current regulation circuit 20 comprises two current regulation units 20e, 20f. The input terminal of the O-ring diode 22 comprises a first input terminal and a second input terminal. The first input terminal of the O-ring diode 22 is connected to a node between the eleventh resistor R11 and the thirteenth resistor R13 of the current regulation unit 20e, and the second input terminal of the O-ring diode 22 is connected to a node between the eleventh resistor R11 and the thirteenth resistor R13 of the current regulation unit 20f. The output terminal of the O-ring diode 22 is connected to the network device 30. The O-ring diode 22 adds the output current signals of the POE ports 10a, 10b together to drive the network device 30. In other embodiments, the O-ring diode 22 can be other modules that can add current signals together.

In one embodiment, the switch Q3 can be a metal-oxide semiconductor field effect transistor (MOSFET), a transistor, for example.

In one embodiment, when the current regulation circuit 20 comprises more than two current regulation units 20e, 20f, the comparison unit 204a compares the output current signals output by the POE ports to each other to determine which POE port outputs the current signal with the highest value. The comparison unit 204a outputs the comparison signals based on the comparison. For example, the output current signals of the POE port 10a have the highest value. Thus, in the current regulation unit 20e, a value of the positive input terminal of the comparator U1 is greater than a value of the negative input terminal of the comparator U1, the comparator U1 outputs high-level signals, and the feedback unit 206a has no feedback signals to output. In the current regulation unit 20f, the value of the positive input terminal of the comparator U1 is less than the value of the negative input terminal of the comparator U1, the comparator U1 outputs low-level signals, and the feedback unit 206a outputs feedback signals to regulate the output current signals of the POE port 10b. The current regulation units 20e, 20f make the value of the output current signals output by the POE port 10b equivalent to the value of the output current signals output by the POE port 10a. Thus, the POE ports 10a, 10b output current signals with the highest value to drive the network device 30 in parallel.

The current regulation circuit 20 samples and determines which of the output current signals output by the POE ports 10a, 10b has the highest value. The current regulation circuit 20 regulates the output current signals output by the other POE ports to make the value of the output current signals output by each of the POE ports equivalent.

Figure 5:
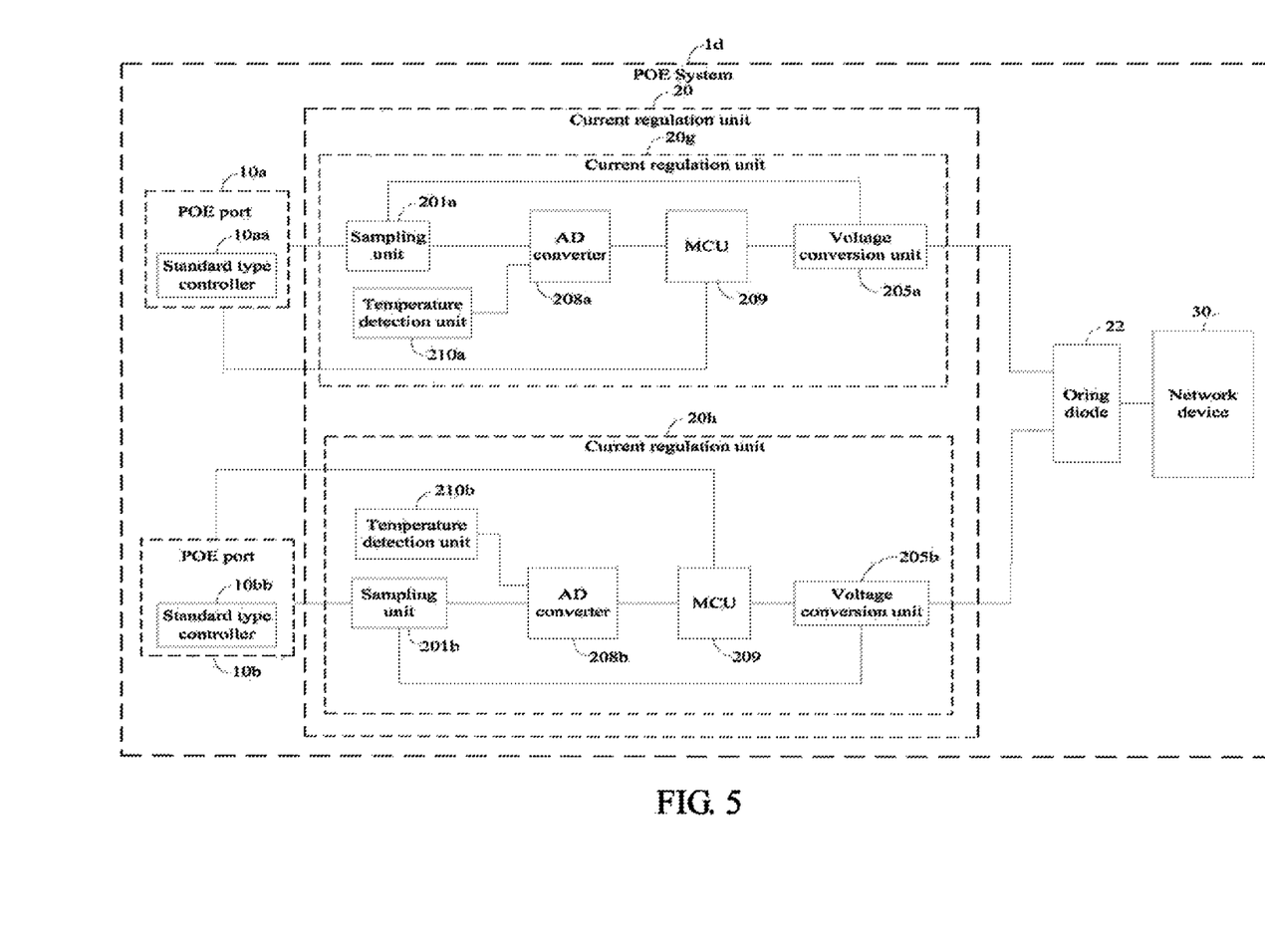
FIG. 5 is a schematic diagram of a fifth embodiment of a POE system.

FIG. 5 is a schematic diagram of a fifth embodiment of a POE system 1d. In one embodiment, the POE system 1d comprises a plurality of current regulation units, such as a current regulation unit 20g and a current regulation unit 20h. The current regulation unit 20g is similar to the current regulation unit 20h. The current regulation unit 20g comprises the sampling unit 201a, the voltage conversion unit 205a, an analog digital (AD) converter 208a, a micro control unit (MCU) 209, and a temperature detection unit 210a. The sampling unit 201a and the voltage conversion unit 205a are similar to the sampling unit 201a and the voltage conversion unit 205a of the third embodiment. The AD converter 208a is connected to the sampling unit 201a and the temperature unit 210a, and the AD converter 208a converts the sampling current signals output by the sampling unit 201a into digital current signals and sends to the MCU 209. The temperature detection unit 210a detects and transmits the external environment temperature to the AD converter 208a. The MCU 209 is connected to the AD converter 208a and the standard type controller 10aa. The MCU 209 converts the digital current signals output by the AD converter 208a into the mean current signals, the MCU 209 integrates and converts the mean current signals to the reference current signals, and the MCU 209 compares the mean current signals with the reference current signals to output the comparison signals. The voltage conversion unit 205a is connected to the sampling unit 201a and the MCU 209, and the voltage conversion unit 205a regulates the output current signals of the POE port 10a according to the comparison signals output by the MCU 209.

In one embodiment, the current regulation units 20g, 20h share the MCU 209. The MCU generates reference current signals according to the digital current signals output by the AD converters 208a, 208b. The MCU 209 further regulates the mean current signals according to the standard type instruction signals output by the standard type controller 10aa or the external environment temperature detected by the temperature detection unit 210a.

In one embodiment, the POE system 1d further comprises the O-ring diode 22. The input terminal of the O-ring diode 22 is connected to the current regulation units 20g, 20h, and the output terminal of the O-ring diode 22 is connected to the network device 30. The O-ring diode 22 integrates current signals output by the current regulation units 20g, 20g together to drive the network device 30.

Figure 6:
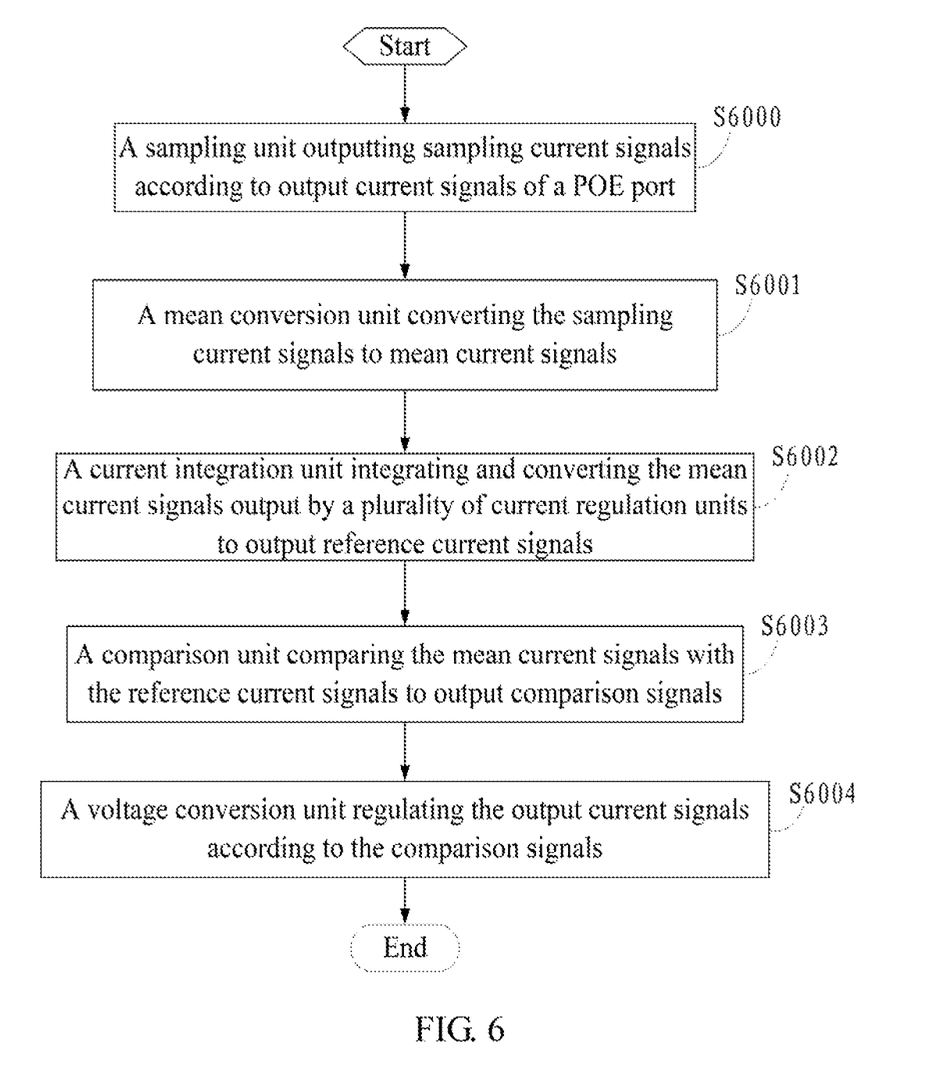
FIG. 6 is a flowchart of a first embodiment of a POE control method.

FIG. 6 is a flowchart of a first embodiment of a POE control method. In block S6000, the sampling unit 201a samples and outputs the sampling current signals according to the output current signals of the POE port 10a. In block S6001, the mean conversion unit 202a converts the sampling current signals output by the sampling unit 201a into the mean current signals. In block S6002, the current integration unit 203a integrates and converts the mean current signals output by the current regulation units 20a, 20b into the reference current signals. In block S6003, the comparison unit 204a compares the mean current signals output by the mean conversion unit 202a with the reference current signals output by the current integration unit 203*a*, and outputs comparison signals based on the comparison. In block S6004, the voltage conversion unit 205*a* regulates the output current signals of the POE port 10*a* according to the comparison signals output by the comparison unit 204*a*.

Figure 7:
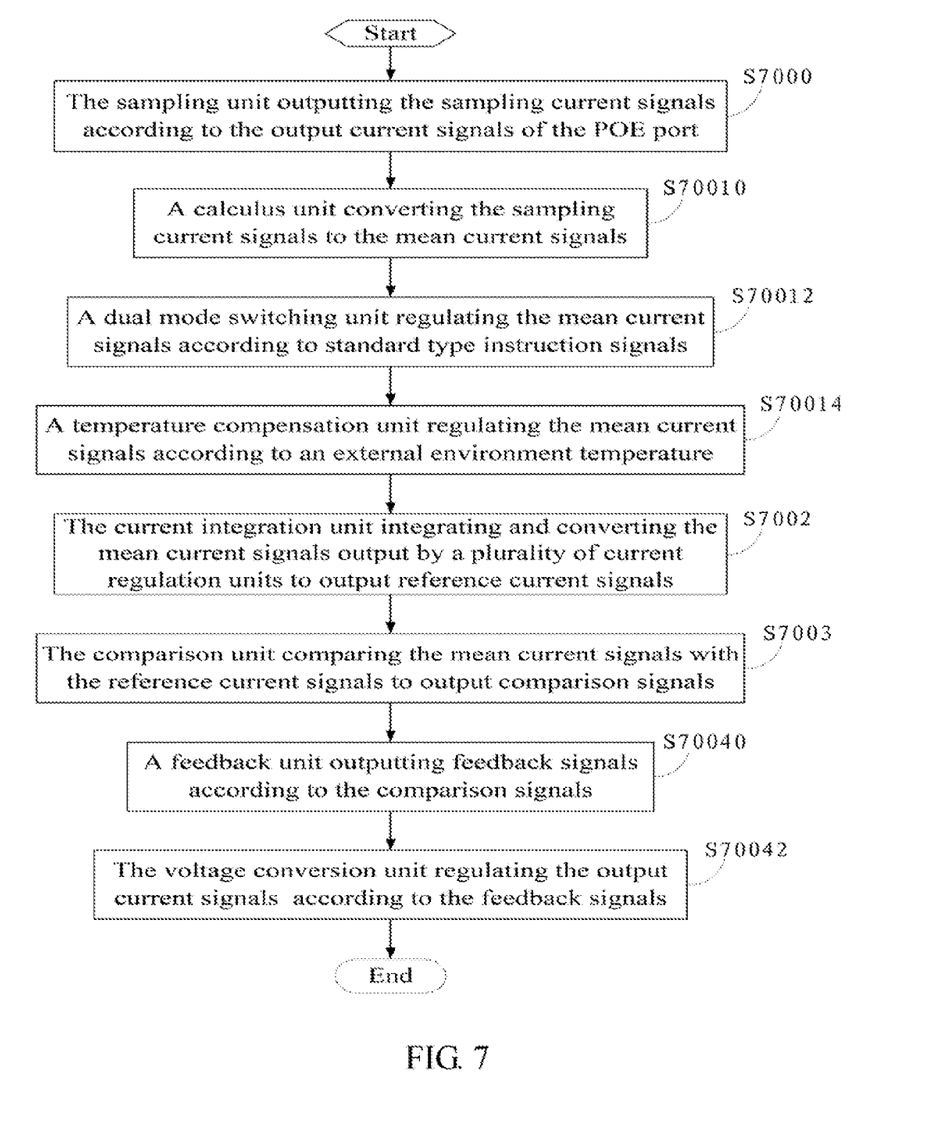
FIG. 7 is a flowchart of a second embodiment of a POE control method.

FIG. 7 is a flowchart of a second embodiment of a POE control method. In one embodiment, blocks S7000, S7002, S7003 are similar to blocks S6000, S6002, S6003 of the first embodiment, respectively. In block S70010, the calculating unit 2024*a* converts the sampling current signals output by the sampling unit 201*a* into the mean current signals. In block S70012, the dual mode switching unit 2026*a* regulates the mean current signals output by the calculating unit 2024*a* according to the standard type instruction signals output by the standard type controller 10*aa* of the POE port 10*a*. In block S70014, the temperature compensation unit 2028*a* regulates the mean current signals output by the calculating unit 2024*a* according to the external environment temperature detected by the temperature compensation unit 2028*a*. In block S70040, the feedback unit 206*a* outputs the feedback signals according to the comparison signals output by the comparison unit 204*a*. In block S70042, the voltage conversion unit 205*a* regulates the output current signals of the POE port 10*a* according to the feedback signals.

Figure 8:
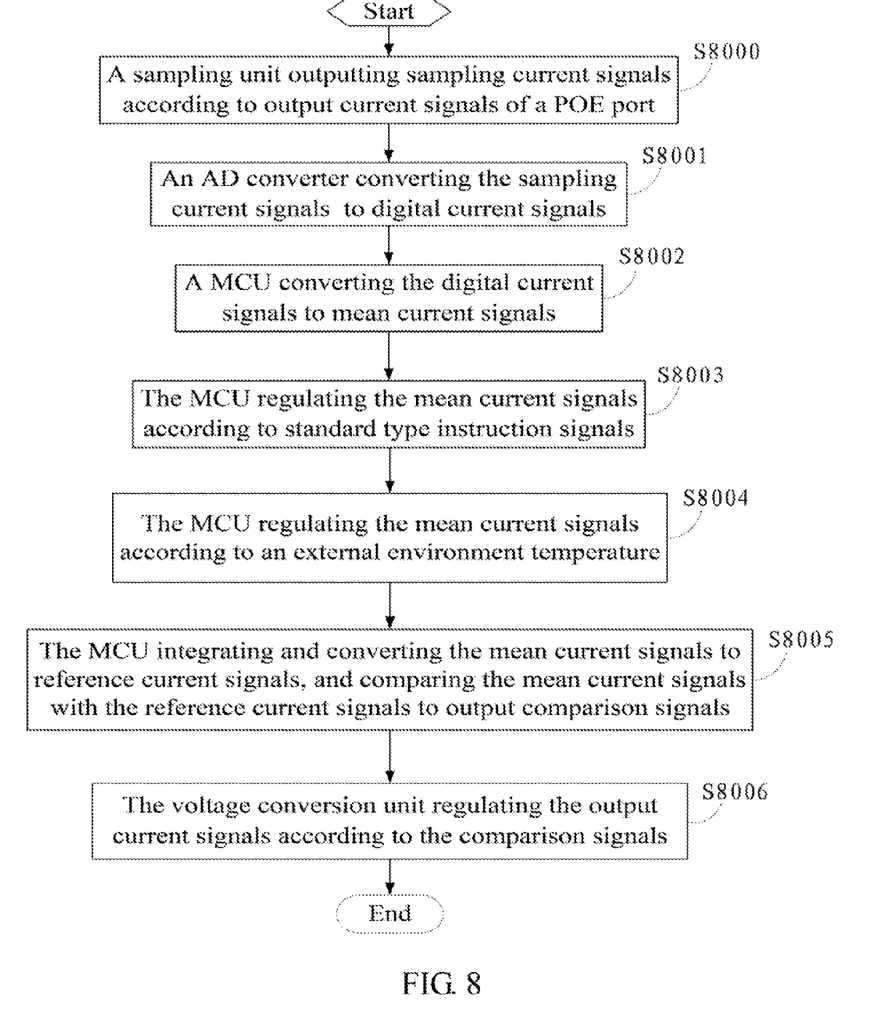
FIG. 8 is a flowchart of a third embodiment of a POE control method.

FIG. 8 is a flowchart of a third embodiment of a POE control method. In one embodiment, blocks S8000, S8006 are similar to blocks S6000, S6004 of the first embodiment, respectively. In block S8001, the AD converter 208*a* converts the sampling current signals output by the sampling unit 201*a* into the digital current signals. In block S8002, the MCU 209 converts the digital current signals output by the AD converter 208*a* into the mean current signals. In block S8003, the MCU 209 regulates the mean current signals according to the standard type instruction signals output by the standard type controller 10*aa* of the POE port 10*a*. In block S8004, the MCU 209 regulates the mean current signals according to the external environment temperature detected by the temperature detection unit 210*a*. In block S8005, the MCU 209 integrates and converts the mean current signals into the reference current signals, and compares the mean current signals with the reference current signals to output comparison signals.

The foregoing disclosure of various embodiments has been presented for the purposes of illustration. It is not intended to be exhaustive or to limit the disclosure to the precise forms disclosed. Many variations and modifications of the embodiments described herein will be apparent to one of ordinary skill in the art in the light of the above disclosure. The scope of the disclosure is to be defined only by the claims appended hereto and their equivalents.

What is claimed is:

1. A current regulation circuit for a plurality of power over Ethernet (POE) ports in parallel to drive a network device, the current regulation circuit comprising a plurality of current regulation units corresponding to the plurality of POE ports, each of the current regulation units regulating output current signals of the corresponding POE port, each of the current regulation units comprising:
   a sampling unit connected to the corresponding POE port, the sampling unit outputting sampling current signals according to the output current signals of the POE port;
   a mean conversion unit connected to the sampling unit, the mean conversion unit converting the sampling current signals output by the sampling unit into mean current signals;
   a current integration unit connected to the mean conversion unit, the current integration unit integrating and converting the mean current signals output by the plurality of current regulation units to output reference current signals;
   a comparison unit connected to the mean conversion unit and the current integration unit, the comparison unit comparing the mean current signals output by the mean conversion unit with the reference current signals output by the current integration unit and outputting comparison signals based on the comparison; and
   a voltage conversion unit connected to the sampling unit and the comparison unit, the voltage conversion unit regulating the output current signals of the POE port according to the comparison signals output by the comparison unit.

2. The current regulation circuit of claim 1, wherein each of the current regulation units further comprises a feedback unit connected between the comparison unit and the voltage conversion unit, the feedback unit outputs feedback signals according to the comparison signals output by the comparison unit, and the voltage conversion unit regulates the output current signals of the POE port according to the feedback signals.

3. The current regulation circuit of claim 2, wherein the voltage conversion unit comprises:
   a PWM controller outputting PWM signals and regulating duty cycle of the PWM signals according to the comparison signals output by the comparison unit to regulate an input voltage of the voltage conversion unit to regulate the output current signals of the POE port;
   a transformer comprising a transformer first input terminal, a transformer second input terminal, a transformer first output terminal, and a transformer second output terminal, the transformer first input terminal connected to the sampling unit;
   a switch comprising a switch control terminal, a switch first terminal, and a switch second terminal, the switch control terminal connected to the PWM controller, the switch first terminal connected to the transformer second input terminal, and the switch second terminal grounded;
   a first diode with a first diode anode connected to the transformer first output terminal, and a first diode cathode connected to the feedback unit;
   a first capacitor with a first capacitor first end connected to a first node between the first diode and the feedback unit, and a first capacitor second end grounded; and
   a first resistor with a first resistor first end connected to a second node between the first capacitor and the feedback unit, and a first resistor second end grounded.

4. The current regulation circuit of claim 3, wherein the feedback unit comprises:
   a second diode with a second diode cathode connected to the comparison unit;
   a second resistor with a second resistor first end connected to a second diode anode, and a second resistor second end connected to the PWM controller;
   a third resistor with a third resistor first end connected to the transformer first output terminal, and a third resistor second end connected a third node between the second resistor and the PWM controller; and
   a fourth resistor with a fourth resistor first end connected to fourth node between the third resistor and the PWM controller, and a fourth resistor second end grounded.

5. The current regulation circuit of claim 1, wherein each of the current regulation units further comprises a isolation unit connected between the mean conversion unit and the comparison unit, and the isolation unit isolates the mean current signals output by the mean conversion unit from the reference current signals output by the current integration unit.

6. The current regulation circuit of claim 5, wherein the isolation unit comprises a first diode with a first diode anode connected to the mean conversion unit, and a first diode cathode connected to the comparison unit.

7. The current regulation circuit of claim 1, wherein the sampling unit comprises:
   a induction coil with an induction coil input connected between the POE port and the voltage conversion unit, and an induction coil output connected to the mean conversion unit;
   a first capacitor with a first capacitor first end connected to a fifth node between the POE port and the induction coil, and a first capacitor second end grounded; and
   a second capacitor with a second capacitor first end connected to a sixth node between the induction coil and the voltage conversion unit, and a second capacitor second end grounded.

8. The current regulation circuit of claim 1, wherein the mean conversion unit comprises:
   a calculating unit connected to the sampling unit and the comparison unit, the calculating unit converting the sampling current signals output by the sampling unit into the mean current signals; and
   a dual mode switching unit connected to the calculating unit and a POE port controller, the dual mode switching unit regulating the mean current signals output by the calculating unit according to instruction signals output by the POE port controller.

9. The current regulation circuit of claim 8, wherein the mean conversion unit further comprises a temperature compensation unit, and the temperature compensation unit regulates the mean current signals output by the calculating unit according to an external environment temperature detected by the temperature compensation unit.

10. The current regulation circuit of claim 9, wherein the temperature compensation unit comprises a first temperature compensation unit and a second temperature compensation unit, the first temperature compensation unit comprises a first thermistor, and the first thermistor connected to a first resistor in parallel, the second temperature compensation unit comprises a second thermistor, and the second thermistor is connected to a second resistor in parallel.

11. The current regulation circuit of claim 8, wherein the calculating unit comprises:
   a first resistor with a first resistor first end connected to the sampling unit, and a first resistor second end connected to the comparison unit;
   a second resistor with a second resistor first end connected to a seventh node between the first resistor and the comparison unit, and a second resistor second end grounded; and
   a first capacitor with a first capacitor first end connected to a eighth node between the first resistor and the second resistor, and a first capacitor second end grounded;
wherein the dual mode switching unit comprises:
   a photoelectric sensor with a photoelectric sensor input terminal connected to the POE port controller, and a photoelectric sensor output terminal connected between the first resistor second end and ground; and
   a third resistor connected between the photoelectric sensor output terminal and the first resistor first end.

12. The current regulation circuit of claim 8, wherein the mean conversion unit further comprises a rectifying unit connected between the sampling unit and the calculating unit, and the rectifying unit rectifies the sampling current signals output by the sampling unit.

13. The current regulation circuit of claim 12, wherein the rectifying unit comprises a first diode with a first diode anode connected to the sampling unit, and a first diode cathode connected to the calculating unit.

14. The current regulation circuit of claim 1, wherein the comparison unit comprises:
   a comparator comprising a comparator positive input terminal, a comparator negative input terminal and a comparator output terminal, the comparator output terminal connected to the voltage conversion unit;
   a first resistor with a first resistor first end connected to the mean conversion unit, and a first resistor second end connected to the comparator positive input terminal;
   a second resistor with a second resistor first end connected to a ninth node between the comparator positive input terminal and the first resistor, and a second resistor second end grounded;
   a third resistor with a third resistor first end connected to the current integration unit, and a third resistor second end connected to the comparator negative input terminal; and
   a fourth resistor with a fourth resistor first end connected to a tenth node between the comparator negative input terminal and the third resistor, and a fourth resistor second end grounded.

15. The current regulation circuit of claim 14, wherein the current integration unit comprises:
   a fifth resistor with a fifth resistor first end connected to a eleventh node between the mean conversion unit and the first resistor, and a fifth resistor second end connected to the third resistor first end;
   a sixth resistor with a sixth resistor first end connected to a twelfth node between the third resistor and the fifth resistor; and
   a first capacitor with a first capacitor first end connected to a sixth resistor second, and a first capacitor second end grounded.

16. A power over Ethernet (POE) system comprising:
   a plurality of POE ports;
   a network device; and
   a current regulation circuit comprising a plurality of current regulation units, the plurality of current regulation units corresponding to the plurality of POE ports, each of the current regulation units regulating output current signals of the corresponding POE port, each of the current regulation units comprising:
   a sampling unit connected to the corresponding POE port, the sampling unit outputting sampling current signals according to the output current signals of the POE port;
   a mean conversion unit connected to the sampling unit, the mean conversion unit converting the sampling current signals output by the sampling unit into mean current signals;
   a current integration unit connected to the mean conversion unit, the current integration unit integrating and converting the mean current signals output by the plurality of current regulation units to output reference current signals;
   a comparison unit connected to the mean conversion unit and the current integration unit, the comparison unit comparing the mean current signals output by the mean conversion unit with the reference current signals output by the current integration unit and outputting comparison signals based on the comparison; and
a voltage conversion unit connected to the sampling unit and the comparison unit, the voltage conversion unit regulating the output current signals of the POE port according to the comparison signals output by the comparison unit.

17. The POE system of claim 16, further comprising an O-ring diode with an O-ring diode input terminal connected to the plurality of current regulation units, and an O-ring diode output terminal connected to the network device, wherein the O-ring diode adds the output current signals of the plurality of POE ports together to drive the network device.

18. A power over Ethernet (POE) method used in a POE system, the POE system comprising a plurality of POE ports, a current regulation circuit and a network device, the current regulation circuit comprising a plurality of current regulation units, each of the current regulation units comprising a sampling unit, a mean conversion unit, a current integration unit, a comparison unit, and a voltage conversion unit, the POE method comprising:
    outputting sampling current signals according to output current signals of a POE port;
    converting the sampling current signals into mean current signals;
    integrating and converting the mean current signals into reference current signals;
    comparing the mean current signals with the reference current signals to output comparison signals; and
    regulating the output current signals of the POE port according to the comparison signals.

19. The POE method of claim 18, wherein the converting the sampling current signals in the POE method comprises:
    converting the sampling current signals to the mean current signals; and
    regulating the mean current signals output by a calculating unit according to instruction signals output by the POE port controller.

20. The POE method of claim 19, wherein the converting the sampling current signals in the POE method further comprises:
    regulating the mean current signals according to an external environment temperature.

21. The POE method of claim 18, wherein the regulating the output current signals in the POE method comprises:
    outputting feedback signals according to the comparison signals, and regulating the output current signals of the POE port according to the feedback signals.

22. A current regulation circuit for a plurality of power over Ethernet (POE) ports in parallel to drive a network device, the current regulation circuit comprising a plurality of current regulation units, the plurality of current regulation units corresponding to the plurality of POE ports, each of the current regulation units regulating output current signals of the corresponding POE port, each of the current regulation units comprising:
    a sampling unit connected to the corresponding POE port, the sampling unit outputting sampling current signals according to the output current signals of the POE port;
    an analog digital (AD) converter connected to the sampling unit, the AD converter converting the sampling current signals output by the sampling unit into digital current signals;
    a micro control unit (MCU) connected to the AD converter, the MCU converting the digital current signals output by the AD converter into mean current signals, integrating and converting the mean current signals output by the plurality of current regulation units into reference current signals, and comparing the mean current signals with the reference current signals to output comparison signals; and
    a voltage conversion unit connected to the sampling unit and the MCU, the voltage conversion unit regulating the output current signals of the POE port according to the comparison signals output by the MCU.

23. The current regulation circuit of claim 22, wherein the MCU further regulates the mean current signals according to instruction signals output by the POE port controller.

24. The current regulation circuit of claim 22, wherein each of the current regulation units further comprises a temperature detection unit, the temperature detection unit detects and transmits an external environment temperature to the AD converter, and the MCU further regulates the mean current signals according to the external environment temperature.

25. A power over Ethernet (POE) system comprising:
    a plurality of POE ports;
    a network device; and
    a current regulation circuit for a plurality of POE ports in parallel to drive the network device, the current regulation circuit comprising a plurality of current regulation units, the plurality of current regulation units corresponding to the plurality of POE ports, each of the current regulation units regulating output current signals of the corresponding POE port, each of the current regulation units comprising:
    a sampling unit connected to the corresponding POE port, the sampling unit outputting sampling current signals according to the output current signals of the POE port;
    an analog digital (AD) converter connected to the sampling unit, the AD converter converting the sampling current signals output by the sampling unit into digital current signals;
    a micro control unit (MCU) connected to the AD converter, the MCU converting the digital current signals output by the AD converter into mean current signals, integrating and converting the mean current signals output by the plurality of current regulation units into reference current signals, and comparing the mean current signals with the reference current signals to output comparison signals; and
    a voltage conversion unit connected to the sampling unit and the MCU, the voltage conversion unit regulating the output current signals of the POE port according to the comparison signals output by the MCU.

26. The POE system of claim 25, further comprising an O-ring diode with an O-ring diode input terminal connected to the plurality of current regulation units, and an O-ring diode output terminal connected to the network device, wherein the O-ring diode adds the current signals of the plurality of POE ports together to drive the network device.

27. A power over Ethernet (POE) method used in a POE system, the POE method comprising:
    outputting sampling current signals according to the output current signals of a POE port;
    converting the sampling current signals into digital current signals;
    converting the digital current signals into mean current signals, integrating and converting the mean current signals into reference current signals, and comparing the mean current signals with the reference current signals to output comparison signals; and regulating the output current signals of the POE port according to the comparison signals.

28. The POE method of claim 27, wherein the converting the digital current signals in the POE method comprises:
converting the digital current signals into the mean current signals and regulating the mean current signals according to instruction signals.

29. The POE method of claim 27, wherein the converting the digital current signals the POE method comprises:
converting the digital current signals into the mean current signals and regulating the mean current signals according to an external environment temperature.

\* \* \* \* \*